Feb. 26, 1963 A. A. STUART 3,079,072
MULTI-CURVE GRAPH READER
Filed Nov. 30, 1959
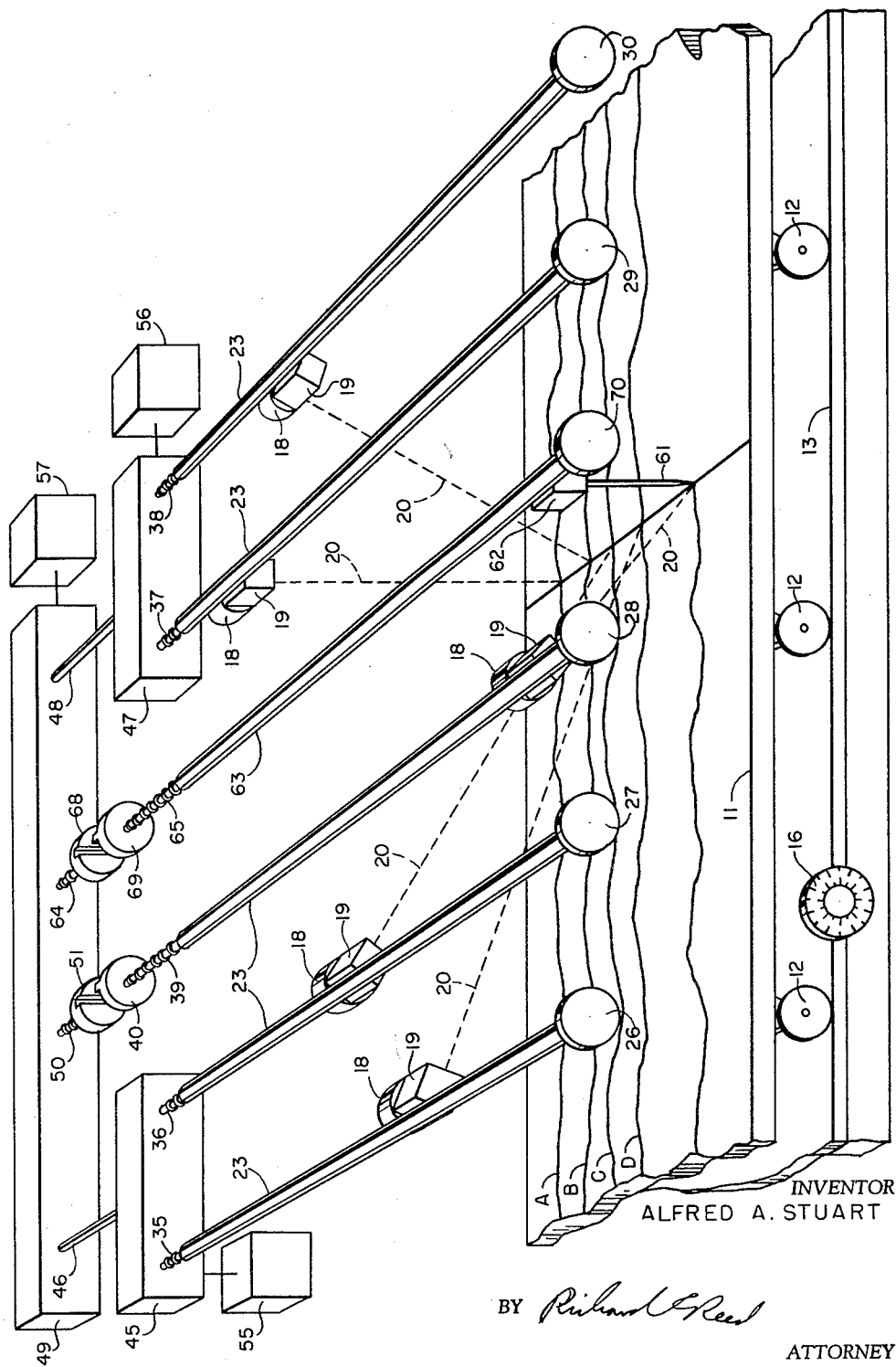
INVENTOR
ALFRED A. STUART
BY *Richard G. Reed*
ATTORNEY United States Patent Office 3,079,072
Patented Feb. 26, 1963

3,079,072
MULTI-CURVE GRAPH READER
Alfred A. Stuart, Orlando, Fla., assignor to the United States of America as represented by the Secretary of the Navy
Filed Nov. 30, 1959, Ser. No. 856,313
5 Claims. (Cl. 235—58)
(Granted under Title 35, U.S. Code (1952), sec. 266)

The invention described herein may be manufactured and used by or for the Government of the United States of America for governmental purposes without the payment of any royalties thereon or therefor.

This invention relates in general to line followers and in particular to the following or reading of several lines on a graph without interference between the followers.

In the field of graph reading and line following it is often desirable to read or follow several curves simultaneously and without interruption. Such a procedure has not heretofore been possible with line followers or readers of solid material which interfered when the curves being followed approached one another and interlocked when the curves crossed one another. This interference and interlocking can cause errors in reading curve values and a substantial loss of time of personnel performing the work. Errors and time loss are also substantial when several curves on one sheet or chart are read consecutively or intermittently, such as by one operator, or when the values of points on several curves are combined in either a mechanical or automatic computer. The present invention avoids the errors and lost time associated with prior line reading methods or devices and provides substantial advantages some of which are indicated in the following specification.

It is an object of the present invention to enable a curve to be read without contact with the surface on which the curve is scribed.

Another object of this invention is to enable a plurality of curves on a single surface to be read without contact with that surface.

A further object of the present invention is to enable a plurality of curves on a single surface to be read without the individual reading means interfering with one another.

A further object of this invention is to combine the values of respective points on a plurality of curves having common coordinates without the individual reading means interfering with one another.

A further object of this invention is to combine the values of respective points on a plurality of curves having common coordinates without the individual reading means interfering with one another and to provide for indication of the combined values on a remote indicator or on the surface on which the curves are scribed.

Various other objects and advantages will appear from the following description of one embodiment of the invention, with the novel features particularly pointed out hereinafter in connection with the appended claims, when read in conjunction with the accompanying drawing wherein there is shown an isometric view of the embodiment.

The present invention includes within its scope the reading of a plurality of curves having common coordinates by light rays which are movable along or parallel to one of the coordinates. The illustrated embodiment shows light sources mounted on follower arms with the light sources movable along the arms so as to position a pencilled beam on a respective curve. Motions of pairs of arms are combined into an output motion which drives another follower arm and positions a light beam attached thereto at a point representing a combination of the values of the points measured. The combination of values is incidental to the underlying principle of maintaining followers on arms displaced from one another yet carrying means for directing each beam at a given point on a common coordinate.

Referring to the drawing, table 11 is movable longitudinally on conventional means such as wheels 12 and guided by a conventional device such as guide rail 13. Longitudinal motion is transmitted to the table by conventional manual or electric means not shown controlled via transverse positioning knob 16, and is imparted to curves A, B, C and D which are scribed or drawn on the table or on a surface such as a chart or graph sheet fastened to the table also by conventional means not shown. Positioned above table 11 are light sources 18 connected with prisms 19 or other reflecting means for directing light beams 20 to the plane of curves A, B, C and D. Light sources 18 can be mounted separately from prisms 19 or a single source of light can be directed by the prisms or other reflecting means to provide a plurality of light beams focused by a beam concentrating device not shown in the plane of the curves to be read. Light sources 18 and prisms 19 are movably supported each pair by a respective follower arm 23. The arms 23 are mounted above table 11 parallel to one another and perpendicular to the longitudinal edge of table 11. Movement of light beams 20 transversely across the table is provided by having input shafts 35, 36, 37 and 38 and output shaft 39 threaded and attached by conventional fittings not shown to light sources 18 and prisms 19 such that rotation of transverse positioning knobs 26, 27, 28, 29 and 30 will cause the respective light sources and prisms to move parallel to the axes of shafts 35 through 39.

Input shafts 35 and 36 are rotated by knobs 26 and 27, input shafts 37 and 38 are rotated by knobs 29 and 30 and output shaft 39 is rotated by knob 28. Shaft 39 has a coupling 40 attached to the end thereof adapted to engage a mating coupling 51. Input shafts 35 and 36 convey motion from knobs 26 and 27 to differential gear 45 while input shafts 37 and 38 convey motion from knobs 29 and 30 to a differential gear 47. Output shafts 46 and 48 convey motion from differential gears 45 and 47, respectively, to differential gear 49 from which the resultant motion is transmitted to the follower arm designated to indicate an answer, in the present embodiment the follower arm connected to knob 28, through output shaft 50.

The ordinate value corresponding to a given position of the light beams moved by knobs 26 and 27 is displayed on indicating means 55 while the value corresponding to movement of knobs 29 and 30 is displayed on indicating means 56. Indicating means 57 displays the value corresponding to the positioning of the light beam connected to knob 28, which is the summation of the separate values displayed on indicating means 55 and 56.

Stylus 61 is attached to movable mounting 62 which travels along follower arm 63 upon rotation of the arm. Output shaft 64 of differential gear 49 imparts rotation to follower arm 63 via shaft 65 when couplings 68 and 69 are engaged. The engagement of couplings 40 and 51 and 68 and 69 is accomplished through conventional means not shown. The position of stylus 61 can be changed as desired through rotation of reset knob 70. Stylus 61 and mounting 62 are removable by conventional means not shown when no trace is desired to be made by the stylus.

It should be noted that the summation or combining feature can be omitted and all five light beams, in the illustrated embodiment, operated so as to indicate on individual indicating means the ordinate values corresponding to selected points on respective curves. Tracing by stylus can, as noted, be included or omitted as desired, it being optional to remove the stylus when a trace is not wanted so as to provide a clearer view of the chart or graph.

In operating the invention, a chart or graph is attached to the top of table 11 and the table moved longitudinally by rotating positioning knob 16 to position each successive ordinate selected by the operator. Indices used to read the curves and indicate the resultant answer are small spots of light, about 1/32 of an inch in diameter in the present embodiment, which are generated in light sources 18, reduced to size by pinholes not shown and directed to the selected ordinate by prisms 19 and a suitable beam concentrating device not shown. Rotation of the positioning knobs 26, 27, 28, 29 and 30 will move respective light spots along the selected ordinate to each of five curves or, in the present embodiment, to each of four curves with the light spot positioned by knob 28 representing the combined values of the four inputs to differential gears 45 and 47 plus a constant. When any follower knob not connected for combining values is turned it rotates an input shaft of a differential gear. The input shafts are combined in pairs and an output obtained which, when couplings 49 and 51 are engaged, automatically positions the light beam on the follower to which the couplings are attached. The summation of four curves and a selected constant is thus possible in the illustrated embodiment of this invention, or, the summation of four curves and a constant with the indication only of values on a fifth curve.

It will be appreciated that the principle of the present invention permits the reading or following of a plurality of curves on a common surface without the possibility of interference between the means designating specific points on the curves. It is possible to read eight curves on a common surface with substantial savings in time over the use of conventional means for determining point values and combining such values. No time loss is encountered where curves approach one another closely or cross such as is sustained when solid objects used to measure values interfere or interlock.

It will further be appreciated that although this invention has been described in an embodiment having a longitudinally movable chart or graph with the light beams moved transversely thereto, the graph may be maintained stationary and longitudinal motion obtained via a frame carrying the transversely movable light beams. It is also within the scope of this invention to read polar graphs with the light beams, the polar graph being rotated and the beams moved radially or the graph maintained stationary and relative motion obtained through circular and radial motion of the light beams. The light beams similarly may be used in chart recording devices thereby permitting recordation of several variables on a single photosensitive surface notwithstanding that the curves representing the variables may intersect or approach each other so closely as to become tangent.

The present invention may be used primarily for measuring or comparing point values, for measuring and feeding point values into a mechanical computer with or without indication of a combination of point values on the surface containing the curves read, in combination with an automatic computer both for reading and recording values and for plotting combinations of the values read, or in a number of other manners suggested by the foregoing description and drawing. Thus, it will be understood that various changes in details, materials, steps and arrangements of parts, which have been herein described and illustrated in order to explain the nature of the invention, may be made by those skilled in the art within the principle and scope of the invention as expressed in the appended claims.

What is claimed is:

1. A device for reading curves on a surface adapted for controlled movement in at least one selected direction comprising light beam means for producing pencilled beams of light, mounting means for positioning said light beam means over said surface and directing said light beams at various selected angles to a selected ordinate on said surface, means for moving each of said light beams in a direction transverse to said selected direction, and measuring means for measuring the movement of said means for moving said light beams.

2. A device for reading curves on a surface adapted for controlled movement in at least one selected direction comprising light beam means for producing pencilled beams of light, mounting means for positioning said light beam means over said surface and directing said light beams at various selected angles to a selected ordinate on said surface, means for moving each of said light beams in a direction transverse to said selected direction, differential means connected to said means for moving each of said light beams for combining the linear movement thereof, and indicating means for indicating the output of said differential means.

3. A device for reading curves on a surface adapted for controlled movement in at least one selected direction comprising light beam means for producing pencilled beams of light, mounting means for positioning said light beam means over said surface and directing said light beams at various selected angles to a selected ordinate on said surface, means for moving each of said light beams in a direction transverse to said selected direction, differential means connected to said means for moving each of said light beams for combining the linear movement thereof, and output means including an output light beam connected to said differential means for indicating on said surface the output of said differential means.

4. A device for reading curves on a surface adapted for controlled movement in at least one selected direction comprising light beam means for producing pencilled beams of light, mounting means for positioning said light beam means over said surface and directing said light beams at various selected angles to a selected ordinate on said surface, means including lateral motion imparting means for moving each of said light beams in a direction transverse to the direction of movement of said surface, said mounting means partially enclosing and coaxial with said lateral motion imparting means, differential means connected to said means for moving for combining the linear movement, thereof, and output means including stylus means connected to said differential means for recording on said surface the output of said differential means.

5. A device for reading points on a plurality of curves and manually or automatically combining their ordinate or abscissa values comprising a movable surface for moving said curves in at least one selected direction, a plurality of light sources at least equal in number to the number of said curves, mounting means for positioning said light sources over said surface and directing light beams from said sources at various selected angles to a selected ordinate on said surface, input means connected to said light sources for moving said sources and said light beams transverse to the direction of movement of said surface, differential means connected to said input means for combining the linear movements of said input means, and output means including an output light beam connected to said differential means for indicating on said surface the output of said differential means.

References Cited in the file of this patent

UNITED STATES PATENTS

| Re. 19,009 | McGaughy | Nov. 28, 1933 |
| 1,489,782 | Newell | Apr. 8, 1924 |
| 2,199,769 | Woolley | May 7, 1940 |
| 2,232,086 | Van Den Akker | Feb. 18, 1941 |
| 2,243,730 | Ellis | May 27, 1941 |
| 2,342,938 | Hopkins | Feb. 29, 1944 |
| 2,442,098 | Shewell et al. | May 25, 1948 |
| 2,604,955 | Hawkins | July 29, 1952 |